US Patent Office 3,053,770
Patented Sept. 11, 1962

3,053,770
PERMANENT MAGNET
William E. Counts, Flint, Mich., assignor to General Motors Corporation, Detroit, Mich., a corporation of Delaware
No Drawing. Filed Apr. 17, 1958, Ser. No. 729,059
4 Claims. (Cl. 252—62.5)

This invention relates to a new magnet and magnetic material, and to a method for making same. It has as one of its objects the provision of an improved low-cost ceramic magnetic material. Another object is the provision of an improved permanent magnet of high magnetic strength. Another object is to provide an improved composition and method with which there may be economically produced hard ceramic magnets of high magnetic strength.

These objects are accomplished in accordance with the invention by forming a magnet of a composition consisting of ferric oxide, barium oxide and bismuth oxide, wherein the molar ratio of ferric oxide to barium oxide is approximately 6:1 and wherein the bismuth oxide constitutes from 4% to 20% by weight, and preferably 6% of the total mass. The oxides, or materials to produce them as hereinafter described, are thoroughly mixed, pressed or otherwise formed to the desired shape, and then fired at sintering temperature after which a magnetic field is applied to orient the magnetic poles as desired. To obtain optimum magnetic strength and physical properties, it is desirable to use an initial firing operation and then repulverize, press and fire again, all as hereinafter described in detail.

In preparing the raw batch, the ferric oxide and barium oxide compounds may be added separately or, if desired, these ingredients may be added in the form of barium ferrite, $BaO \cdot 6Fe_2O_3$. If the barium compound is incorporated into the raw batch as a separate ingredient, it may be added as barium oxide (BaO), barium peroxide ($BaO_2$), barium carbonate ($BaCO_3$), or an organic salt such as oxalate, the oxide or peroxide being preferred. Where the iron compound is added separately, as distinguished from addition as $BaO \cdot 6Fe_2O_3$, it should preferably be incorporated in the batch as the oxide $Fe_2O_3$. However, ferrous nitrate, ferrous carbonate, or the like which convert to the oxide on firing may be used if desired though not to the same advantage. The bismuth ingredient may be added to the batch either as the oxide ($Bi_2O_3$), or the subcarbonate ($Bi_2O_3 \cdot CO_2 \cdot H_2O$), preferably as the subcarbonate. It will be understood, of course, that the quantities of the ingredients added to the raw batch should be on the basis of the required amounts of the oxides as indicated above, since any carbonates, etc., will convert to the oxides during firing.

The preferred ceramic composition for the magnetic material consists of about 81% by weight $Fe_2O_3$, 13% by weight BaO and 6% by weight $Bi_2O_3$. The following additional examples will serve to illustrate the compositions comprehended by the invention:

69% $Fe_2O_3$, 11% BaO, 20% $Bi_2O_3$;
74% $Fe_2O_3$, 12% BaO, 14% $Bi_2O_3$;
77.5% $Fe_2O_3$, 12.5% BaO, 10% $Bi_2O_3$;
82.7% $Fe_2O_3$, 13.3% BaO, 4% $Bi_2O_3$.

It will be understood, of course, that during the firing operation, the oxides interact and therefore do not exist as such in the finished magnetic material. Thus, the compositions indicated in the above examples are those of the raw batches or of the finished magnets as would be found by chemical analysis and expressed in terms of the single oxides.

The $Fe_2O_3$-to-BaO molar ratio of 6 to 1 should be maintained close, with no more than a three percent excess of either of these materials since any substantial deviation from the specified ratio leads to a substantial reduction in magnetic strength. It is equally important that the percentage of bismuth oxide be maintained within the specified range, the optimum magnetic properties being attained with a 6% addition.

The following example will serve to illustrate the method of making magnets in accordance with the invention: 81 parts by weight ferric oxide, 13 parts by weight barium oxide, and 6.8 parts by weight bismuth subcarbonate are ground together in alcohol for about 16 to 20 hours in a ball mill to produce a finely divided intimate mixture. This fluid slip is dried, mixed with a 3% by weight paraffin wax-in-water emulsion, dried and then granulated to pass through a 20-mesh screen. The granulated wax-bonded material is then pressed into briquettes or other desired shapes at a pressure on the order of 15,000 to 20,000 pounds per square inch after which the briquettes or other shapes are fired in air at about 900° C. for a two-hour period and then cooled gradually to room temperature. During this sintering operation, the shrinkage may be on the order of 17% to 20%. The resulting sintered forms are capable of retaining a magnetic charge of fairly high strength; however, to obtain optimum magnetic properties it is preferred that the following additional processing steps be employed. The briquettes are crushed, as in a mortar, pulverized in a hammer mill or the like, and then dry-ground in a ball mill for another 16 to 20 hours such that the resulting material has a grain size on the order of 200 mesh. The dry, pulverized material is again mixed with a 3% by weight paraffin wax-in-water emulsion, dried and granulated to approximately 20 mesh. The granulated material is pressed to the desired shape, as in steel dies or the like, at a pressure of about 15,000 to 20,000 pounds per square inch. The pressed forms are then heated in a circulating air atmosphere, the temperature being increased at the rate of about 100° F. per half hour until a temperature of 700° F. is attained. Then the forms are fired in air at 1100° C. on a four- to five-hour schedule after which they are allowed to cool slowly in the furnace (air atmosphere) to room temperature to avoid cracking due to thermal shock. During this firing operation there may be an additional shrinkage on the order of about 10%. The cooled pieces may be polished flat on the surfaces to be magnetized and then magnetized on a high energy condenser discharge magnet charger.

By means of the second or repeated pulverizing-firing procedure, magnets can be accomplished which have about double the magnetic strength of those which result from using only a single firing step as indicated above for forming the briquettes. If desired, the magnetic material from the first firing operation or from the second firing operation, preferably the latter for optimum magnetic strength, may be pulverized and the pulverized material uniformly mixed with a suitable plastic, for example polystyrene, formed to the desired shape as by injection molding, and then magnetized by means of a magnet charger.

While the invention has been described with reference to particular embodiments thereof, it is understood that changes and modifications may be made, all within the full and intended scope of the claims which follow.

What is claimed is:

1. A ceramic composition for use in making magnets which, after firing to sintering temperature, consists essentially of a ferrite showing on chemical analysis $Fe_2O_3$ and BaO in a molar ratio of about 6 to 1, and from 4% to 20% by weight $Bi_2O_3$.

2. A ceramic composition for use in making magnets which, after firing to sintering temperature, consists essentially of a ferrite showing on chemical analysis $Fe_2O_3$ and BaO in a molar ratio of about 6 to 1, and about 6% by weight $Bi_2O_3$.

3. A ceramic magnet consisting essentially of a ferrite which shows on chemical analysis $Fe_2O_3$ and BaO in a molar ratio of about 6 to 1, and from 4% to 20% by weight $Bi_2O_3$.

4. A ceramic magnet consisting essentially of a ferrite which shows on chemical analysis $Fe_2O_3$ and BaO in a molar ratio of about 6 to 1, and about 6% by weight $Bi_2O_3$.

References Cited in the file of this patent

UNITED STATES PATENTS

| | | |
|---|---|---|
| 2,762,778 | Gorter et al. | Sept. 11, 1956 |

FOREIGN PATENTS

| | | |
|---|---|---|
| 747,737 | Great Britain | Apr. 11, 1956 |
| 1,139,342 | France | Feb. 11, 1957 |